(12) United States Patent
Suzui

(10) Patent No.: US 8,913,148 B2
(45) Date of Patent: Dec. 16, 2014

(54) INFORMATION SUPPLYING APPARATUS, LENS APPARATUS, CAMERA APPARATUS AND IMAGE PICKUP SYSTEM

(75) Inventor: Masaki Suzui, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 362 days.

(21) Appl. No.: 12/921,147

(22) PCT Filed: May 19, 2009

(86) PCT No.: PCT/JP2009/002206
§ 371 (c)(1),
(2), (4) Date: Sep. 3, 2010

(87) PCT Pub. No.: WO2009/142002
PCT Pub. Date: Nov. 26, 2009

(65) Prior Publication Data
US 2011/0013051 A1    Jan. 20, 2011

(30) Foreign Application Priority Data

May 19, 2008    (JP) .................................. 2008-130659

(51) Int. Cl.
*H04N 5/228* (2006.01)
*H04N 5/357* (2011.01)
*G03B 17/14* (2006.01)
*H04N 5/232* (2006.01)

(52) U.S. Cl.
CPC .............. *H04N 5/3572* (2013.01); *G03B 17/14* (2013.01); *H04N 5/23296* (2013.01); *H04N 5/23212* (2013.01)
USPC ....................................................... 348/222.1

(58) Field of Classification Search
USPC ....................................................... 348/222.1
See application file for complete search history.

(56) References Cited

U.S. PATENT DOCUMENTS 5,905,530 A * 5/1999 Yokota et al. ............. 348/240.99
7,391,926 B2 * 6/2008 Arazaki .......................... 382/275
7,623,299 B2 * 11/2009 Kuroda et al. ................. 359/684

(Continued)

FOREIGN PATENT DOCUMENTS

JP        06-181530 A    6/1994
JP    2006-135805 A    5/2006

(Continued)

OTHER PUBLICATIONS

International Search Report issued in related PCT/JP2009/002206 mailed Aug. 25, 2009.

(Continued)

*Primary Examiner* — James Hannett
(74) *Attorney, Agent, or Firm* — Rossi, Kimms & McDowell LLP

(57) ABSTRACT

The information supplying apparatus (11, 131) is configured to supply first information to an image processing apparatus performing image processing for reducing an image component which is included in an image obtained by image pickup through an optical system and is generated due to aberration of the optical system. The first information is used in the image processing. The information supplying apparatus includes an information acquiring part (11) configured to acquire second information showing a state of at least one of an optical adjusting element (15) included in the optical system and an operation part operated for actuating the optical adjusting element, and an information generating part (131) configured to generate, based on the second information, the first information used in the image processing performed at a point in time after acquisition of the second information.

71 Claims, 14 Drawing Sheets

(56) References Cited

U.S. PATENT DOCUMENTS

| | | |
|---|---|---|
| 8,023,009 B2 * | 9/2011 | Cho .............................. 348/241 |
| 2006/0147200 A1 | 7/2006 | Arimoto et al. |
| 2007/0126892 A1 | 6/2007 | Guan |
| 2008/0240709 A1 | 10/2008 | Nakamura |

FOREIGN PATENT DOCUMENTS

| | | | |
|---|---|---|---|
| JP | 2006-270918 A | 10/2006 | |
| JP | 2008-278463 A | 11/2008 | |
| WO | 2007-066459 A1 | 6/2007 | |

OTHER PUBLICATIONS

Written Opinion issued in related PCT/JP2009/002206 mailed Aug. 25, 2009.

JP Office Action issued May 28, 2013 for corresponding JP2008-130659.

* cited by examiner

INFORMATION SUPPLYING APPARATUS, LENS APPARATUS, CAMERA APPARATUS AND IMAGE PICKUP SYSTEM

This application is a U. S. National Phase Application of PCT International Application PCT/JP2009/002206 filed on May 19, 2009 which is based on and claims priority from JP 2008-130659 filed on May 19, 2008, the contents of which are incorporated herein by reference in their entirety.

TECHNICAL FIELD

The present invention relates to technique for reducing deterioration of a captured image due to optical aberration.

BACKGROUND ART

Images (videos) captured through optical systems often include deterioration caused by aberration of the optical system. The deterioration includes, for example, defocusing caused by chromatic aberration of the optical system in respective colors in the captured image and distortion of the captured image caused by distortion aberration of the optical system.

Japanese Patent Laid-Open No. 2006-135805 has disclosed an apparatus which calculates an amount of chromatic aberration on an image pickup plane to perform image processing (hereinafter referred to as "aberration correction image processing") for correcting deterioration of a captured image caused by the chromatic aberration.

However, the aberration correction image processing requires a certain amount of time to be performed. Further, it is necessary to newly calculate correction data (hereinafter referred to as "aberration correction data") used for the aberration correction image processing because a zoom operation of an optical system changes chromatic aberration generated in the optical system. The aberration correction data for an actual zoom position is calculated by interpolation calculation or the like using the aberration correction data (table data) for representative zoom positions prepared in advance. Therefore, the calculation of the aberration correction data requires an amount of time.

The amount of time required for the calculation of the aberration correction data causes a delay from image pickup of an image (hereinafter referred to as "correction target image") which is a target of the aberration correction image processing until the aberration correction image processing is allowed after the calculation of the aberration correction data. In other words, even if the aberration correction image processing on the correction target image is desired to be started immediately after the image pickup of the correction target image, the aberration correction data cannot be generated in time for the aberration correction image processing. It is possible to generate the aberration correction data in advance by using a zoom position before the image pickup of the correction target image. However, since that aberration correction data is not generated based on a zoom position at the point in time of the image pickup of the correction target image, it is not possible to appropriately perform the aberration correction image processing.

SUMMARY OF INVENTION

The present invention provides an information supplying apparatus, a lens apparatus, a camera apparatus and an image pickup system which enable appropriate aberration correction image processing on a correction target image with less delay.

The present invention provides as one aspect thereof an information supplying apparatus configured to supply first information to an image processing apparatus performing image processing for reducing an image component which is included in an image obtained by image pickup through an optical system and is generated due to aberration of the optical system, the first information being used in the image processing. The information supplying apparatus includes an information acquiring part configured to acquire second information showing a state of at least one of an optical adjusting element included in the optical system and an operation part operated for actuating the optical adjusting element, and an information generating part configured to generate, based on the second information, the first information used in the image processing performed at a point in time after acquisition of the second information.

The present invention provides as other aspects thereof a lens apparatus, a camera apparatus and an image pickup system each including the above-mentioned information supplying apparatus.

DESCRIPTION OF EMBODIMENTS

Exemplary examples of the present invention will hereinafter be described with reference to the accompanying drawings.

EXAMPLE 1

Figure 1:
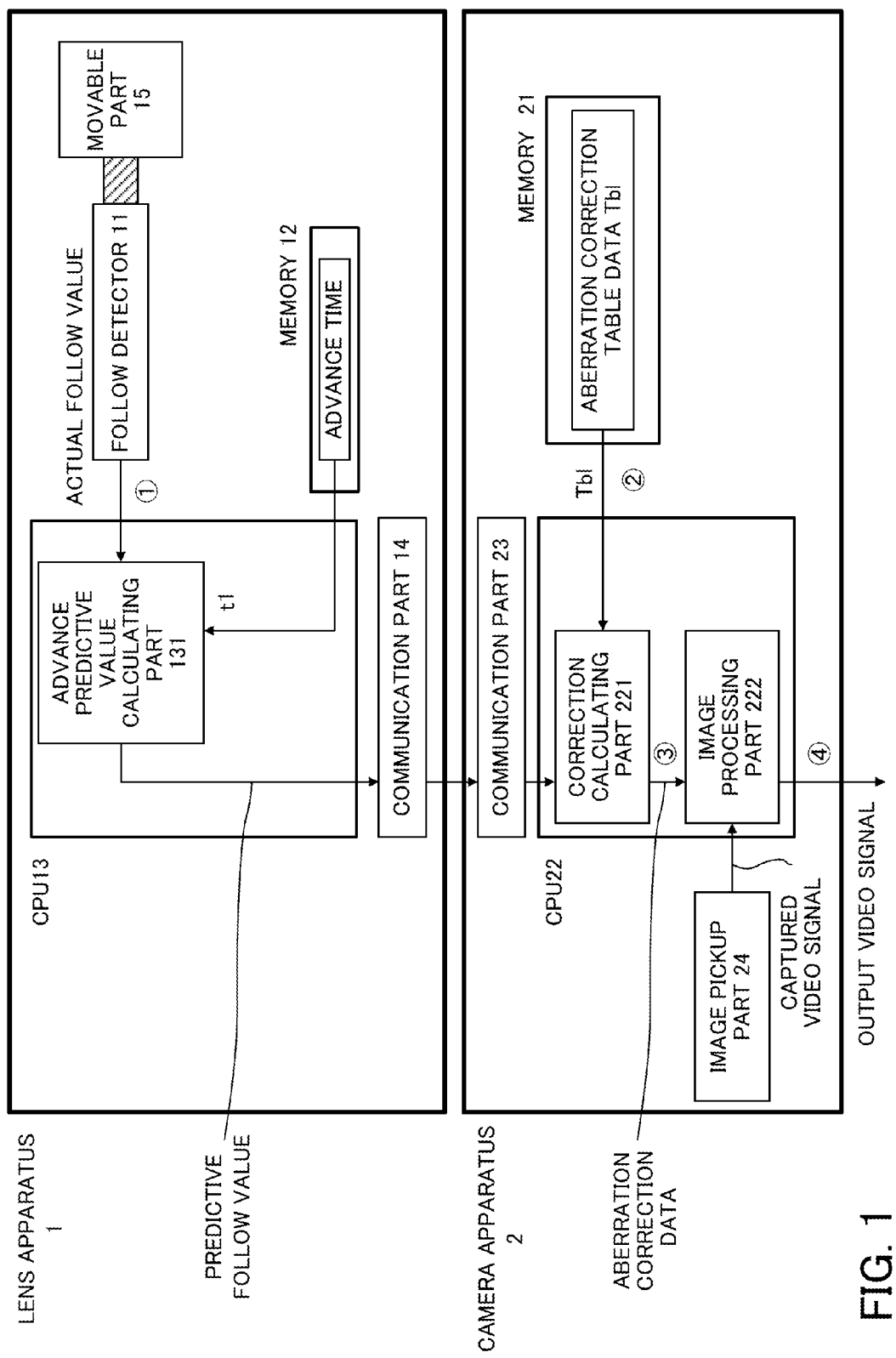
FIG. 1 is a block diagram showing a configuration of an image pickup system that is Example 1 of the present invention.

FIG. 1 shows a configuration of an image pickup system using a lens apparatus 1 including an information supplying apparatus that is a first example (Example 1) of the present invention and a camera apparatus 2 including an image processing apparatus.

The lens apparatus 1 includes an optical system (not shown), a movable part 15 included in the optical system, a follow detector 11 detecting a state (position) of the movable part 15, a memory 12, a CPU 13 and a communication part 14.

The movable part 15 includes optical adjusting elements such as a magnification-varying lens, a focus lens, an iris (aperture stop) and an image stabilizing mechanism (IS). The movable part 15 also includes operation members (operation parts) such as operation rings to actuate the optical adjusting elements through a zoom operation, a focus operation and an iris operation. In this example, manual operations of the operation members are mechanically transmitted to the magnification-varying lens, the focus lens and the iris to actuate them.

The position of the optical adjusting element means at least one of a position of the magnification-varying lens in a direction of the optical axis (hereinafter referred to as "optical axis direction"), a position of the focus lens in the optical axis direction, a position of a stop blade (plate-like light-shielding member) of the iris in a plane perpendicular to the optical axis, and positions of driving members for driving them.

The position of the operation member means a rotational position of the operation ring (for example, a clockwise or counterclockwise rotational angle of the operation ring from its predetermined rotational angle), or a signal sent to a motor or the like according to the operation (rotation) of the operation member.

The signal sent to the motor or the like may be a signal (absolute position command signal) indicating an absolute position of the optical adjusting element, or may be a signal (incremental signal) giving thereto a positional difference from a current position of the optical adjusting element.

The follow detector 11 which is an information acquiring part detects (acquires) a state (position) of at least one of the optical adjusting element and the operation member by using a sensor such as a potentiometer to output a follow value showing the detected state. Specifically, the sensor of the follow detector 11 is connected with the movable part 15 through a gear, and thereby the movement of the movable part 15 is transmitted to the sensor through the gear. Thus, the sensor outputs the follow value.

The communication part 14 communicates with a communication part 23 provided in the camera apparatus 2. The memory 12 and the CPU 13 will be described later.

The lens apparatus 1 is detachably mounted to the camera apparatus 2. The camera apparatus 2 includes a memory 21, a CPU 22, the communication part 23 and an image pickup part 24.

The image pickup part 24 includes an image pickup element and a signal processing part. The image pickup element is constituted by a CCD sensor, a CMOS sensor or the like and photoelectrically converts an object image formed by the optical system of the lens apparatus 1. The signal processing part generates a captured image (captured video signal) based on a signal output from the image pickup element.

The memory 21 is a nonvolatile memory and stores aberration correction table data Tbl corresponding to representative follow values. The aberration correction data in this example is a parameter (parameter for image processing) used in aberration correction image processing for reducing an image component corresponding to aberration of the optical system, the image component being included in the captured image (captured image signal) obtained by image pickup using the lens apparatus 1 (optical system). The parameter for image processing is, for example, a coefficient or a variable (such as an element of a transformation matrix) included in a transformation equation used for geometric transformation (coordinate transformation) of the captured image. That is, the parameter for image processing can be said as an image transformation parameter.

The CPU 22 includes a correction calculating part 221 and an image processing part 222. In this example, the image processing apparatus is constituted by the correction calculating part 221 and the image processing part 222.

The correction calculating part 221 predictively generates, based on a predictive follow value which is output from the lens apparatus 1 and will be described later and the aberration correction table data Tbl stored in the memory 21, the aberration correction data corresponding to the predictive follow value. The image processing part 222 performs the aberration correction image processing on the captured video image using the aberration correction data from the correction calculating part 221 to output a video signal after the aberration correction image processing as an output video image.

The CPU 13 of the lens apparatus 1 includes an advance predictive value calculating part 131 which is an information generating part. In this example, the follow detector 11 and the advance predictive value calculating part 131 constitute an information supplying apparatus.

The advance predictive value calculating part 131 predictively generates, based on a follow value (which is second information and hereinafter referred to as "actual follow value") detected by the follow detector 11, a follow value (which is first information and hereinafter referred to as "predictive follow value") after the detection (acquisition) of the actual follow value. The predictive follow value is output (supplied) to the camera apparatus 2 and is used in the correction calculating part 221 to generate the aberration correction data. That is, the predictive follow value is information used for performing the aberration correction image processing.

This example defines a time period (predetermined time period) from a time (current time) at which the actual follow value is detected by the follow detector 11 to a time corresponding to the predictive follow value as an advance time. Moreover, the example describes advance times for plural movable parts 15 relating to the zoom, focus, iris and IS as one common advance time. However, mutually different advance times may be set to the respective movable parts 15. Further, the advance predictive value calculating part 131 may be separately provided for the respective movable parts 15.

The memory 12 is a nonvolatile memory and holds an advance time (fixed value) t1. Into the advance predictive value calculating part 131 in the CPU 13, the actual follow value detected by the follow detector 11 and the advance time t1 held in the memory 12 are input. The advance predictive value calculating part 131 calculates the predictive follow value by using the actual follow value and the advance time t1.

Figure 2:
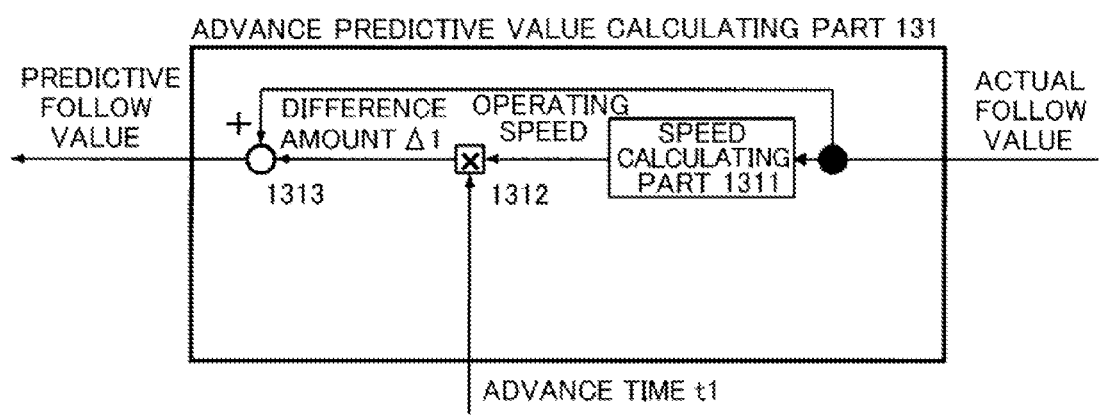
FIG. 2 is a block diagram showing a configuration of an advance predictive value calculating part in Example 1.

FIG. 2 shows a configuration of the advance predictive value calculating part 131. The advance predictive value calculating part 131 calculates a current operating speed of the movable part 15 based on the actual follow value (actual position) thereof, and outputs a position to which the movable part 15 is predicted to be moved in the advance time t1 from the current time as the predictive follow value (predictive position).

The advance predictive value calculating part 131 is constituted by a speed calculating part 1311, a multiplier 1312 and an adder 1313. The speed calculating part 1311 calculates the operating speed of the movable part 15 from a difference between the actual follow values input at a previous sampling timing and a current sampling timing of the CPU 13 (or at a previous update timing and a current update timing of the AD converter).

The multiplier 1312 multiplies the operating speed output from the speed calculating part 1311 by the advance time t1 to calculate a difference amount Δ1 of the predictive follow value from the current actual follow value.

The adder 1313 adds the difference amount Δ1 to the current actual follow value to calculate the predictive follow value.

Thus, the advance predictive value calculating part 131 calculates, based on the actual follow value of the movable part 15 and the advance time t1, the predictive follow value at a point in time after the advance time t1 from the time of the detection of the actual follow value. The calculated predictive follow value is output to the camera apparatus 2 through the communication parts 14 and 23.

Figure 3:
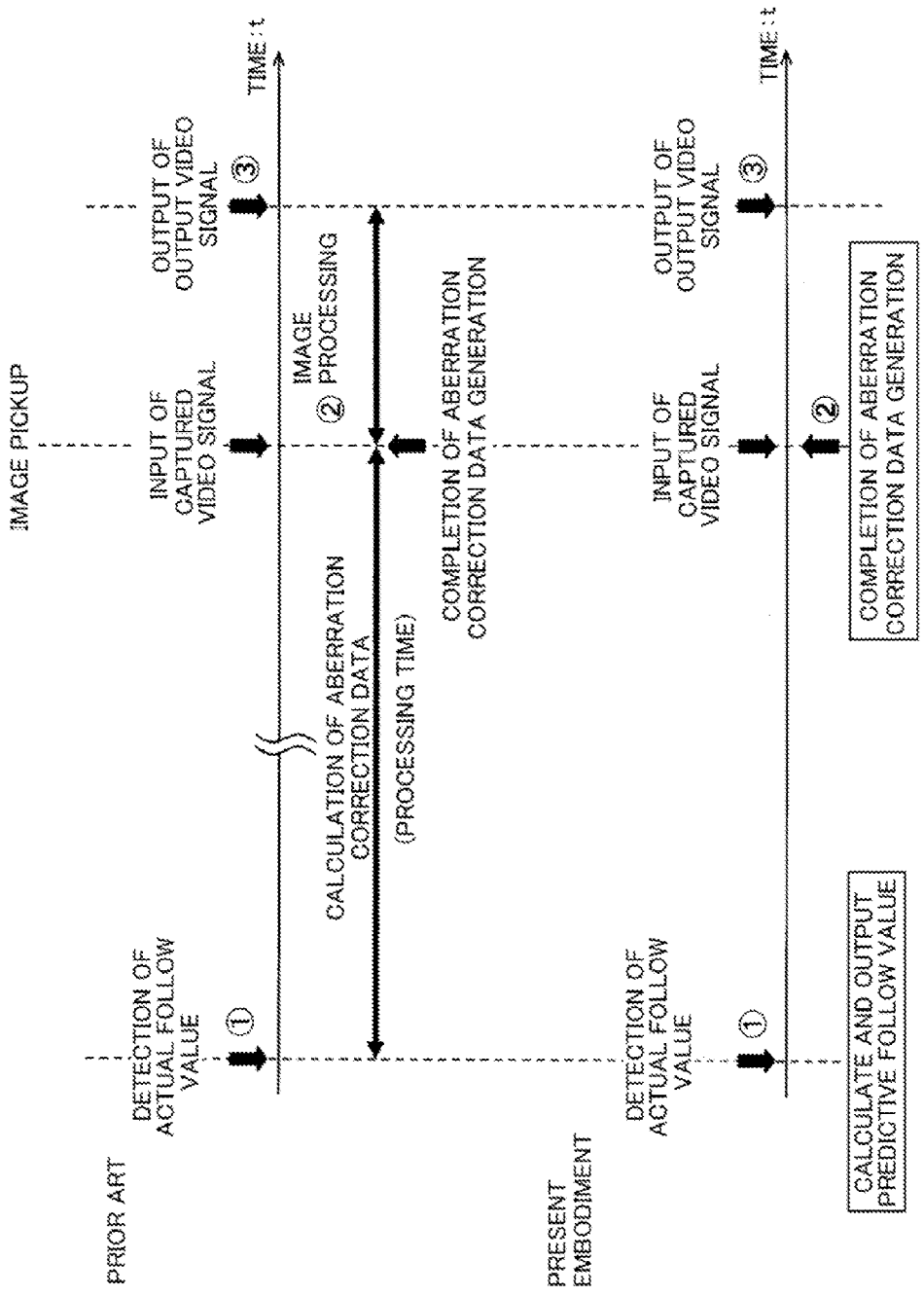
FIG. 3 is a time series chart showing processing in Example 1.

Next, description will be made of a time-series flow of processing in a prior art and that in this example with reference to FIG. 3. Times 1-3 described later are indicated as circled numbers in the figure.

In the prior art, when the actual follow value of the movable part is detected in the lens apparatus (time 1), the aberration correction data is calculated in the camera apparatus. After the calculation of the aberration correction data (time 2), the aberration correction image processing on the captured image signal is performed by using the aberration correction data, and then the output video signal is output (time 3). In this case, the aberration correction data is calculated by using the actual follow value at the time 1 before the time 2 at which the captured image signal is input, and therefore appropriate aberration correction image processing on the captured image signal may not be performed.

On the other hand, in the lens apparatus 1 of this example, at the time 1 at which the actual follow value is detected, the predictive follow value at the time 2 at which the captured image signal is input (that is, at a point in time after the advance time t1 from the time 1) is calculated, and the aberration correction data as predictive data using the predictive follow value is also calculated. In other words, in this example, the aberration correction data is not calculated by using the actual follow value at the time 1 before the captured image signal is input like the prior art. Then, the aberration correction image processing is performed on the captured image signal by using the aberration correction data, and the output video signal is output (time 3). Thus, in this example, since the aberration correction data corresponding to a follow value (predictive follow value) at the time of input of the captured image signal is generated with little delay to the input of the captured image signal, appropriate aberration correction image processing on the captured image signal can be performed.

Figure 4:
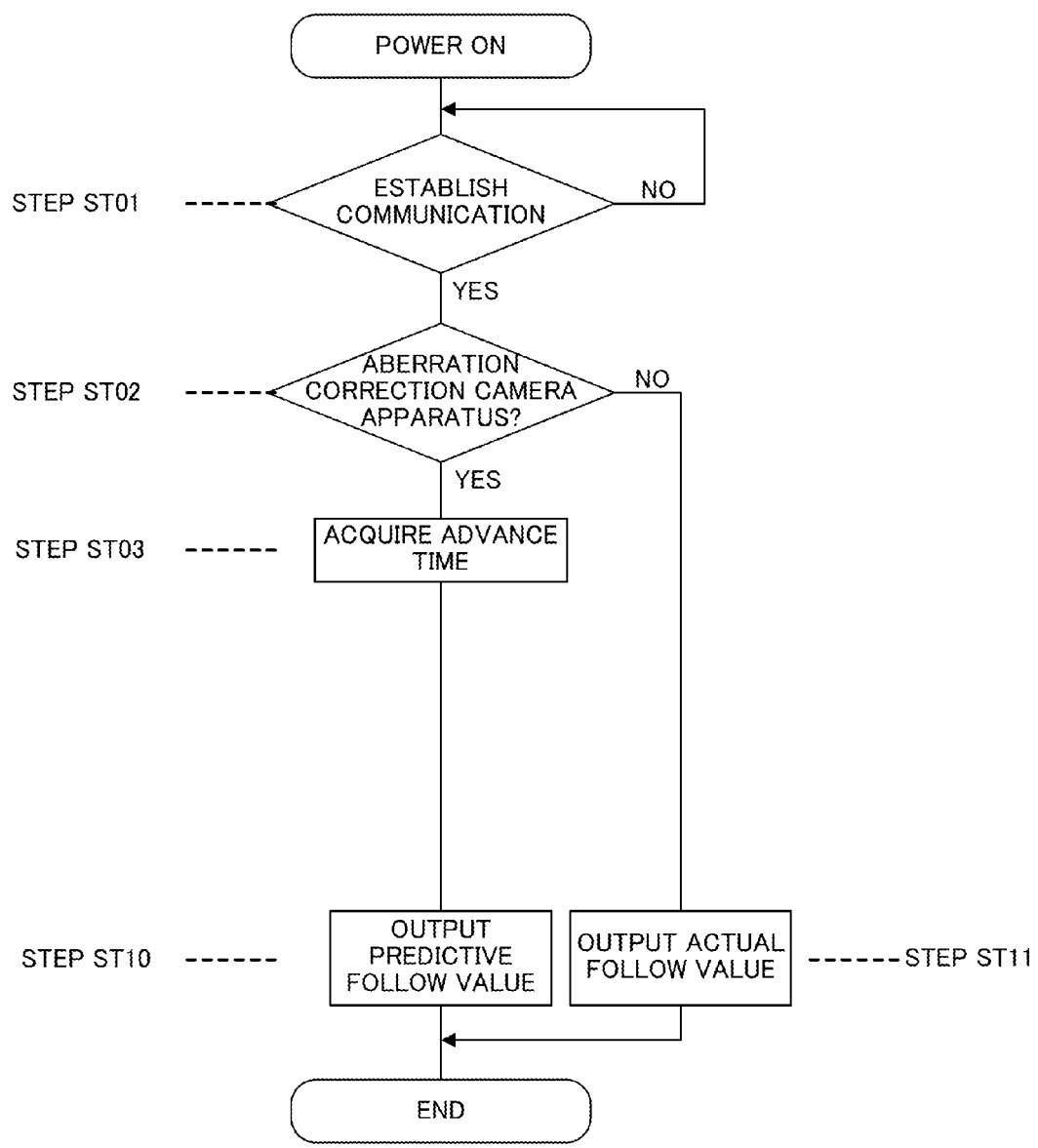
FIG. 4 is a flowchart showing the processing in Example 1.

Next, description will be made of initialization processing after power-on of the lens apparatus 1 with reference to FIG. 4. This initialization processing is performed by the CPU 13 according to a computer program stored in an internal memory thereof.

After power-on, at step ST01, the CPU 13 confirms establishment of communication with the camera apparatus 2. If the communication is established, the process proceeds to step ST02, and if the communication is not established, the process returns to step ST01.

At step ST02, the CPU 13 determines whether or not the camera apparatus 2 is a camera apparatus (hereinafter referred to as "aberration correction camera apparatus") which is capable of performing the aberration correction image processing. If the camera apparatus 2 is the aberration correction camera apparatus, the process proceeds to step ST03, and if the camera apparatus 2 is not the aberration correction camera apparatus, the process proceeds to step ST11.

At step ST03, the CPU 13 reads the advance time t1 from the memory 12, and then the process proceeds to step ST10.

At step ST10, the CPU 13 calculates the predictive follow value from the actual follow value detected by the follow detector 11 and the advance time t1 to output it to the camera apparatus 2.

At step ST11, the CPU 13 directly outputs the detected actual follow value to the camera apparatus 2.

Thus, the lens apparatus 1 of this example outputs, when the camera apparatus 2 to which the lens apparatus 1 is mounted is the aberration correction camera apparatus, the predictive follow value to the camera apparatus 2. The lens apparatus 1 of this example outputs, when the camera apparatus 2 is not the aberration correction camera apparatus, the actual follow value to the camera apparatus 2. This makes it possible to use the lens apparatus 1 of this example for not only the aberration correction camera apparatus but also a camera apparatus that is not the aberration correction camera apparatus.

EXAMPLE 2

Figure 5:
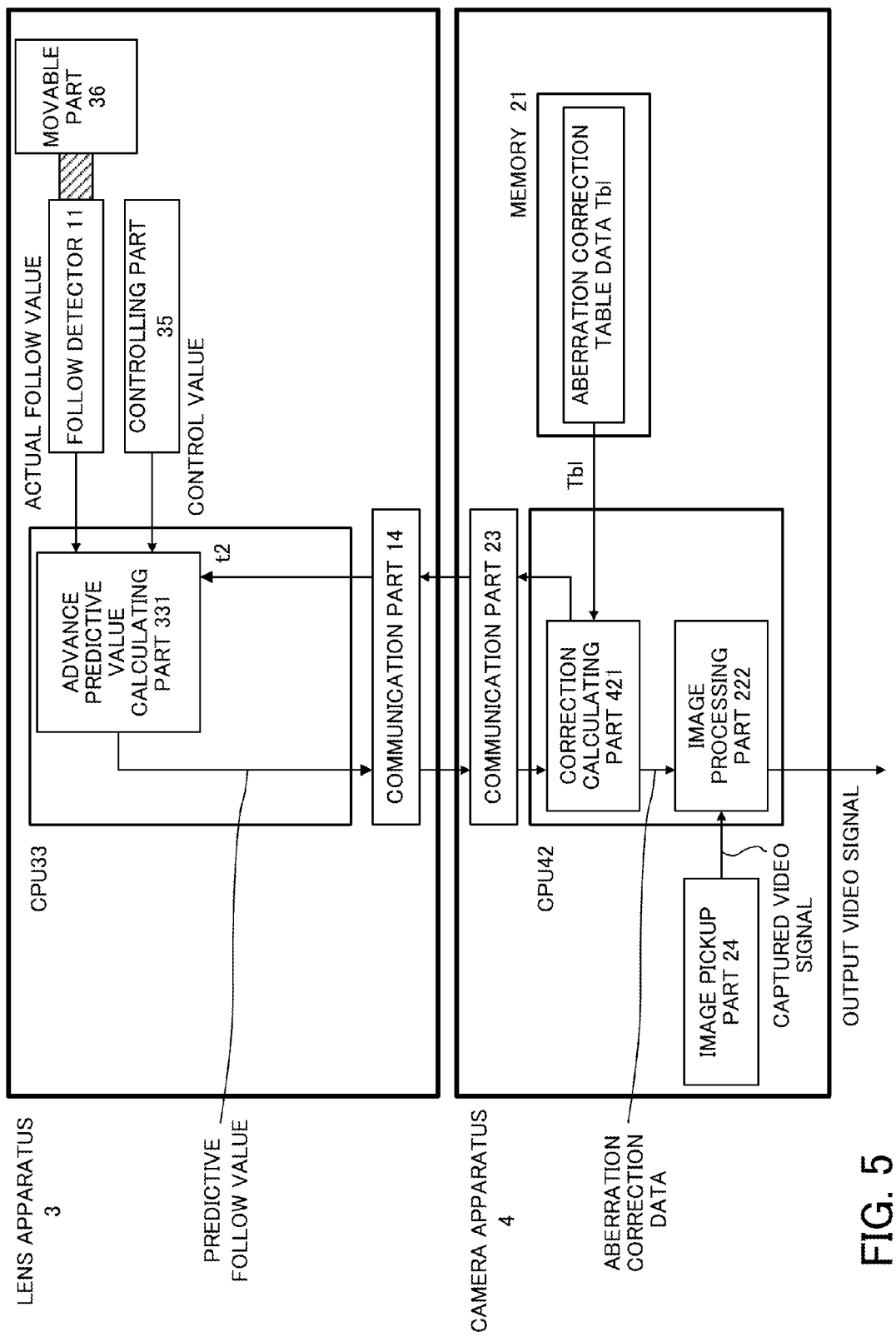
FIG. 5 is a block diagram showing a configuration of an image pickup system that is Example 2 of the present invention.

FIG. 5 shows a configuration of an image pickup system constituted by a lens apparatus 3 including an information supplying apparatus that is a second example (Example 2) of the present invention and a camera apparatus 4 including an image processing apparatus. Components in this example identical to those in Example 1 are denoted with the same reference numerals as those in Example 1, and their descriptions are omitted.

In this example, a CPU 42 (correction calculating part 421) of the camera apparatus 4 outputs a processing time (fixed value) t2 to the lens apparatus 3 through the communication parts 23 and 14. The processing time t2 is a required time period from input of the predictive follow value to calculation (generation) of the aberration correction data in the correction calculating part 421. However, the processing time t2 may not coincide with an actual required time period from the input of the predictive follow value to the calculation of the aberration correction data, and may have a margin with respect to the actual required time period.

Moreover, when plural movable parts 36 are provided in the lens apparatus 3, different processing times t2 may be set for the respective movable parts 36, or a same (common) processing time t2 maybe set for the plural movable parts 36. In this example, the same processing time t2 is set for the plural movable parts 36.

Furthermore, the lens apparatus 3 of this example is provided with a controlling part 35. The controlling part 35 outputs a speed command signal (hereafter referred to as "control value") for controlling an actuator such as motor (not shown) which drives each movable part 36 in the lens apparatus 3. Each movable part 36 in this example has a configuration in which the actuator and a gear (gears) are incorporated with the optical adjusting element described in Example 1 such as the magnification-varying lens, the focus lens or the iris. The optical adjusting element is driven according to the control value. In other words, the movable part 36 is servo-controlled according to an operation of the operation member.

The processing time t2 is input to the lens apparatus 3 from the camera apparatus 4 as mentioned above, and a CPU 33 of the lens apparatus 3 sets an advance time, which is a predetermined time, based on the processing time t2. Therefore, the memory 12 described in Example 1 is not provided in the lens apparatus 3.

An advance predictive value calculating part 331 calculates a predictive follow value based on the control value output from the controlling part 35, the actual follow value output from the follow detector 11 and the processing time t2 input from the camera apparatus 4. The advance predictive value calculating part 331 outputs the predictive follow value to the camera apparatus 2.

Also in this example, the follow detector 11 and the advance predictive value calculating part 331 constitute the information supplying apparatus. Moreover, the correction calculating part 421 and the image processing part 222 constitute the image processing apparatus.

Figure 6:
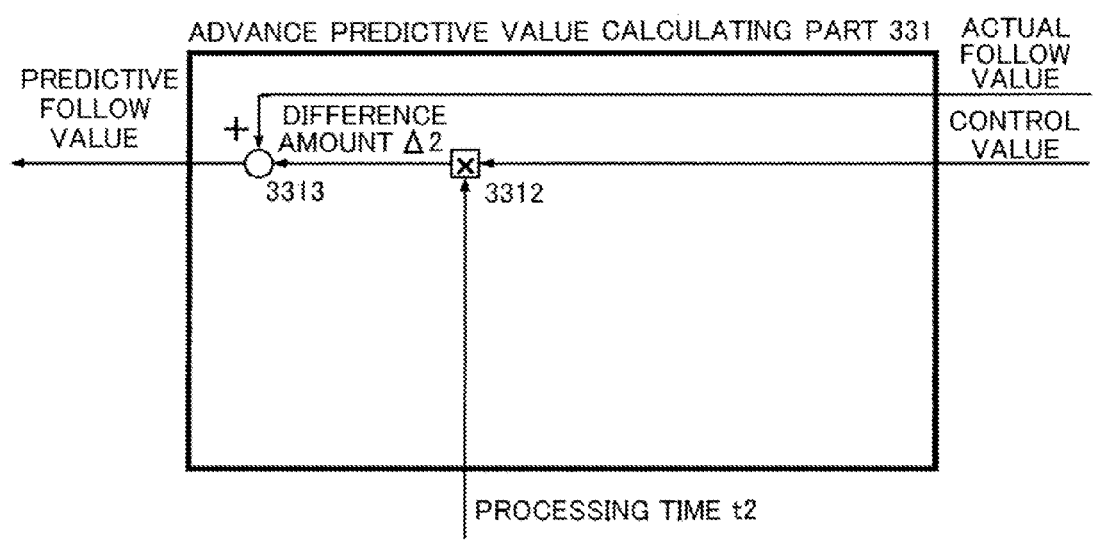
FIG. 6 is a block diagram showing a configuration of an advance predictive value calculating part in Example 2.

FIG. 6 shows a configuration of the advance predictive value calculating part 331 in the CPU 33 provided in the lens apparatus 3. The advance predictive value calculating part 331 outputs the predictive value showing a position to which the movable part 36 is predicted to be moved in the processing time t2 at an operating speed according to the control value.

The advance predictive value calculating part 331 includes a multiplier 3312 and an adder 3313.

The multiplier 3312 multiplies the control value by the processing time t2 to calculate a difference amount $\Delta 2$ of the predictive follow value from a current actual follow value. When multiplying the control value by the processing time t2, additional calculation such as multiplication of a predetermined constant may be performed in consideration of a dimension of the difference amount $\Delta 2$ that is a multiplication result.

The adder 3313 adds the difference amount $\Delta 2$ to the current actual follow value to calculate the predictive follow value.

Thus, the advance predictive value calculating part 331 calculates, based on the actual follow value of the movable part 36, the control value from the controlling part 35 and the processing time (advance time) t2 obtained from the camera apparatus 4, the predictive follow value at a point in time after the processing time t2 from the time of the detection of the actual follow value. The calculated predictive follow value is output to the camera apparatus 4 through the communication parts 14 and 23.

Figure 7:
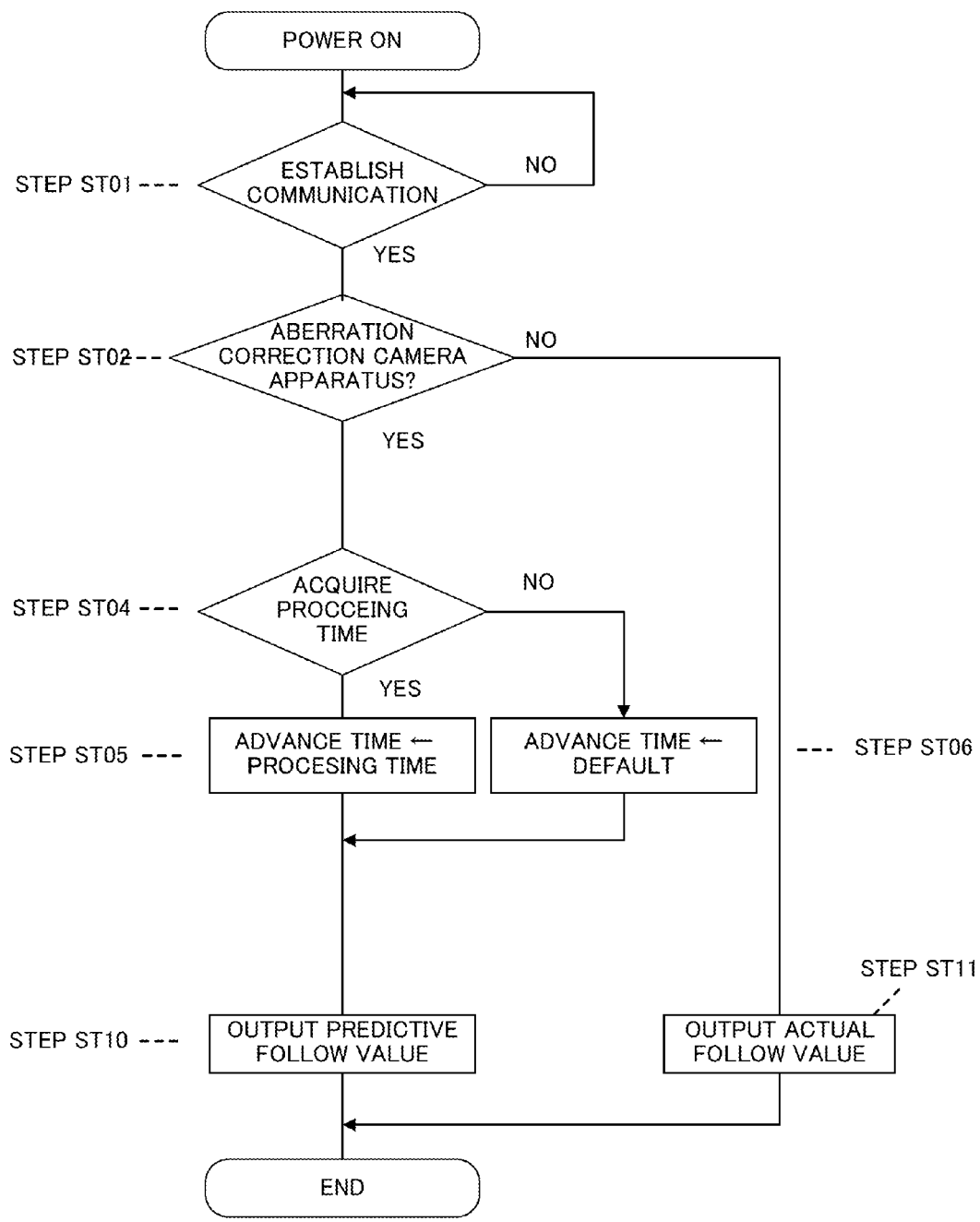
FIG. 7 is a flowchart showing the processing in Example 2.

Next, description will be made of initialization processing after power-on of the lens apparatus 3 with reference to FIG. 7. This initialization processing is performed by the CPU 33 according to a computer program stored in an internal memory thereof.

The processes performed by the CPU 33 at step ST01, step ST02 and step ST11 are the same as those in Example 1.

At step ST04, the CPU 33 determines whether or not the CPU 33 has acquired the processing time t2 from the camera apparatus 4. If the CPU 33 has acquired the processing time t2, the process proceeds to step ST05. If the CPU 33 has not acquired the processing time t2, the process proceeds to step ST06.

At step ST05, the CPU 33 sets the advance time based on the processing time t2. Although the CPU 33 sets the processing time as the advance time without change in this example, a time different from (for example, longer than) the processing time may be set as the advance time.

On the other hand, at step ST06, the CPU 33 sets a default as the advance time. In this example, the default is 0 in this example.

Then, at step ST10, the CPU 33 calculates the predictive follow value from the actual follow value detected by the follow detector 11 and the advance time (processing time t2 or the default) to output it to the camera apparatus 4. Since the default is 0 as described above, when the process proceeds to step ST10 via the step ST06, the predictive follow value which is the same value as the actual follow value is calculated.

Thus, the lens apparatus 3 of this example outputs, when the lens apparatus 3 reads the processing time t2 from the camera apparatus 4 to which the lens apparatus 3 is mounted, the predictive follow value at a point in time after the detection of the actual follow value to the camera apparatus 4. The lens apparatus 3 outputs, when the lens apparatus 3 does not read the processing time t2 from the camera apparatus 4, the predictive follow value which is the same value as the actual follow value to the camera apparatus 4. This makes it possible to use the lens apparatus 3 of this example for not only the camera apparatus 4 which is capable of outputting the processing time t2 but also a camera apparatus which is not capable of outputting the processing time t2.

When the camera apparatus is not capable of outputting the processing time t2, the lens apparatus 3 may hold an advance time which is not 0 in advance in a memory provided therein, and may calculate the predictive follow value to output it to the camera apparatus 4.

Although in this example the description was made of the case where the controlling part 35 provided in the lens apparatus 3 outputs the control value which is a speed command signal, the control value may be a position command signal or a drive signal to be input to the actuator. Moreover, the control value may be input to the lens apparatus 3 from an operation device other than the lens apparatus 3 or from the camera apparatus 4.

EXAMPLE 3

Figure 8:
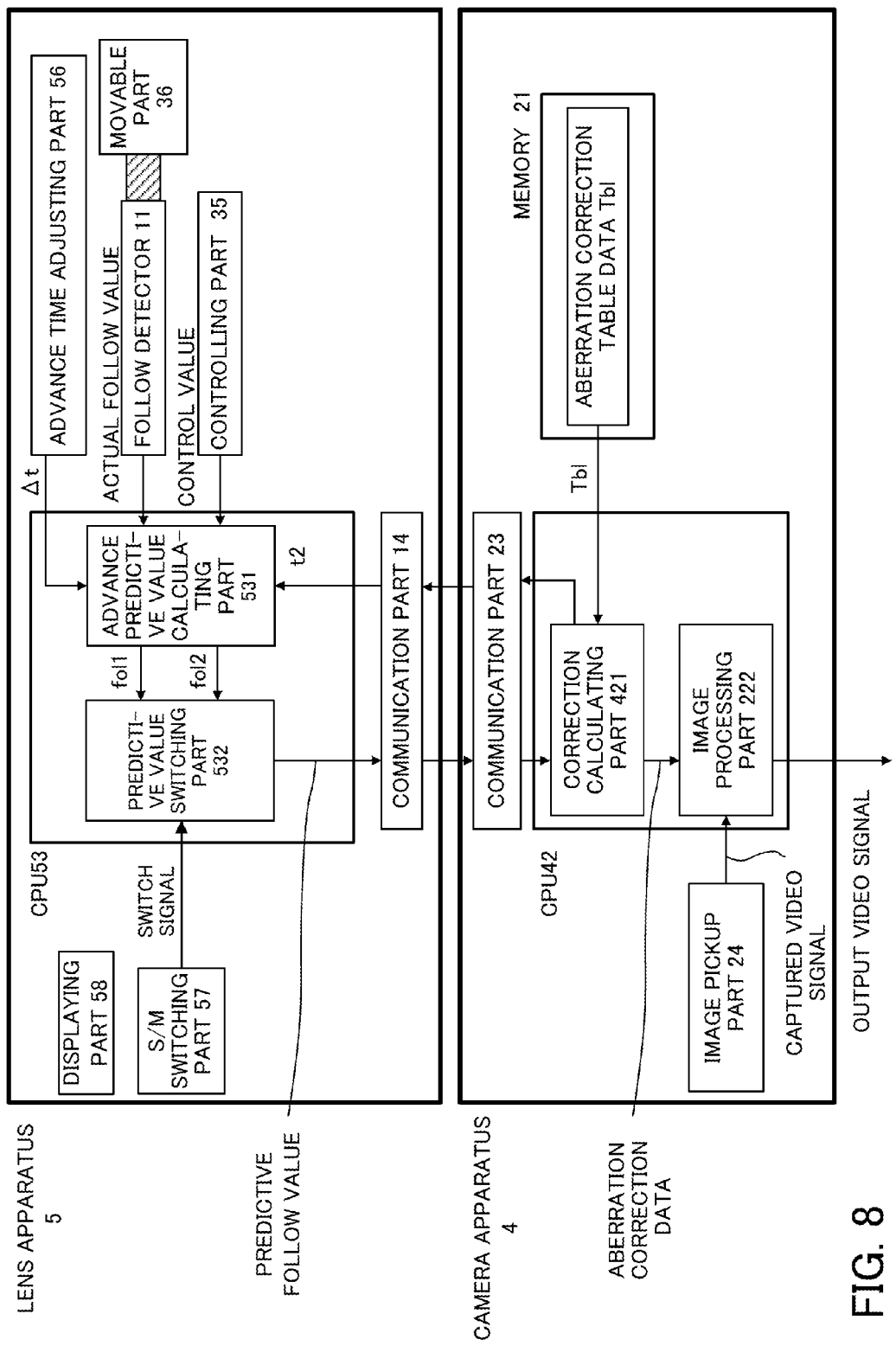
FIG. 8 is a block diagram showing a configuration of an image pickup system that is Example 3 of the present invention.

FIG. 8 shows a configuration of an image pickup system constituted by a lens apparatus 5 including an information supplying apparatus that is a third example (Example 3) of the present invention and the camera apparatus 4 shown in Example 2. Components in this example identical to those in Example 2 are denoted with the same reference numerals as those in Example 2, and their descriptions are omitted.

The lens apparatus 5 in this example is provided with an advance time adjusting part 56 as a predetermined time changing part, an S/M switching part 57 and a displaying part 58, which are added to the lens apparatus 3 in Example 2.

The advance time adjusting part 56 includes an operation member (volume) which is operated by a user to arbitrarily adjust the advance time, and outputs an adjustment amount (ratio of increase and decrease) $\Delta t$ to the advance time as a reference according to the operation of the operation member.

The S/M switching part 57 includes a switch and a switching mechanism to switch servo control and manual operation of the movable part 36 (the magnification-varying lens, the focus lens or the iris). The user's operation of the switch causes the switch mechanism to operate so as to mechanically connect the movable part 36 to its actuator when the servo control is performed, and so as to release the connection when the manual operation is performed. Moreover, the S/M switching part 57 outputs a switch signal according to the operation of the switch.

The displaying part 58 is an information display which displays information such as a determination result of whether or not to calculate the predictive follow value, the advance time and the adjustment amount $\Delta t$.

Figure 9:
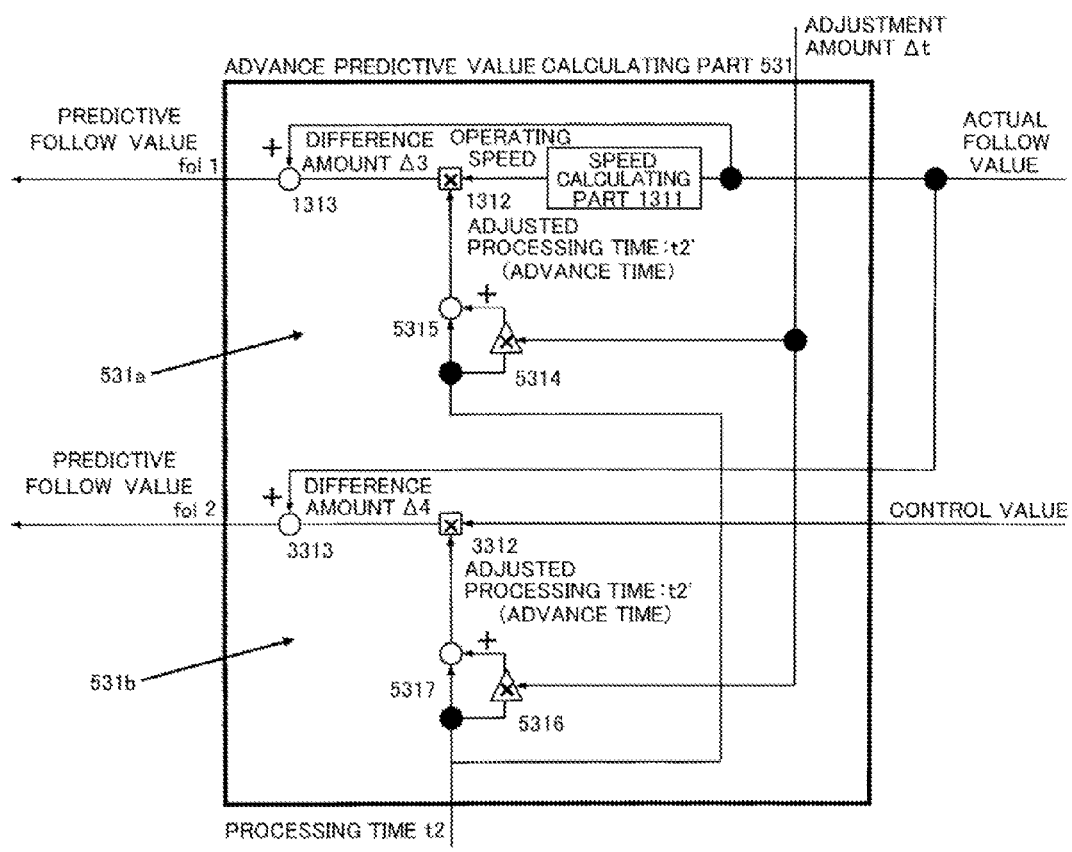
FIG. 9 is a block diagram showing a configuration of an advance predictive value calculating part in Example 3.

A CPU 53 of the lens apparatus 5 includes an advance predictive value calculating part 531 and a predictive value switching part 532. FIG. 9 shows a configuration of the advance predictive value calculating part 531.

The advance predictive value calculating part 531 includes a first predictive value calculating part 531a and a second predictive value calculating part 531b. The first predictive value calculating part 531a calculates a predictive follow value fol1 based on the actual follow value from the follow detector 11, and the second predictive value calculating part 531b calculates a predictive follow value fol2 based on the control value from the controlling part 35.

The first predictive value calculating part 531a includes the speed calculating part 1311, the multiplier 1312, the adder 1313, a multiplier 5314 and an adder 5315. Moreover, the second predictive value calculating part 531b includes the multiplier 3312, the adder 3313, a multiplier 5316 and an adder 5317.

The first predictive value calculating part 531a calculates the predictive follow value foil as follows. The multiplier 5314 first multiplies the processing time t2 read from the camera apparatus 4 as in Example 2 by the adjustment amount Δt output from the advance time adjusting part 56. The adder 5315 adds the multiplication result in the multiplier 5314 to the processing time t2 to output an adjusted processing time t2'. Next, the multiplier 1312 multiplies the adjusted processing time t2' by a current operating speed of the movable part 36 calculated by the speed calculating part 1311 to calculate and output a difference amount Δ3. Then, the adder 1313 adds the difference amount Δ3 to the actual follow value to calculate and output the predictive follow value fol1.

Thus, the first predictive value calculating part 531a calculates, based on the actual follow value of the movable part 36, the operating speed from the speed calculating part 1311 and the adjusted processing time t2', the predictive follow value fol1 which shows a predictive position of the movable part 36 at a point in time after the adjusted processing time t2' from the time of the detection of the actual follow value. The calculated predictive follow value fol1 is output to the predictive value switching part 532.

The second predictive value calculating part 531b calculates the predictive follow value fol2 as follows. The multiplier 5316 first multiplies the processing time t2 by the adjustment amount Δt output from the advance time adjusting part 56. The adder 5317 adds the multiplication result in the multiplier 5316 to the processing time t2 to output an adjusted processing time t2'. Next, the multiplier 3312 multiplies the adjusted processing time t2' by the control value to calculate and output a difference amount Δ4. Then, the adder 3313 adds the difference amount Δ4 to the actual follow value to calculate and output the predictive follow value fol2.

Thus, the second predictive value calculating part 531b calculates, based on the actual follow value of the movable part 36, the control value from the controlling part 35 and the adjusted processing time t2', the predictive follow value fol2 which shows a predictive position of the movable part 36 at a point in time after the adjusted processing time t2' from the time of the detection of the actual follow value. The calculated predictive follow value fol2 is output to the predictive value switching part 532.

The predictive value switching part 532 selects one of the predictive follow value fol1 and the predictive follow value fol2 according to the switch signal from the S/M switching part 57 to output the selected predictive follow value to the camera apparatus 4 through the communication parts 14 and 23.

In this example, the follow detector 11, the advance predictive value calculating part 531 and the predictive value switching part 532 constitute the information supplying apparatus. The correction calculating part 421 and the image processing part 222 constitute an image processing apparatus.

Figure 10:
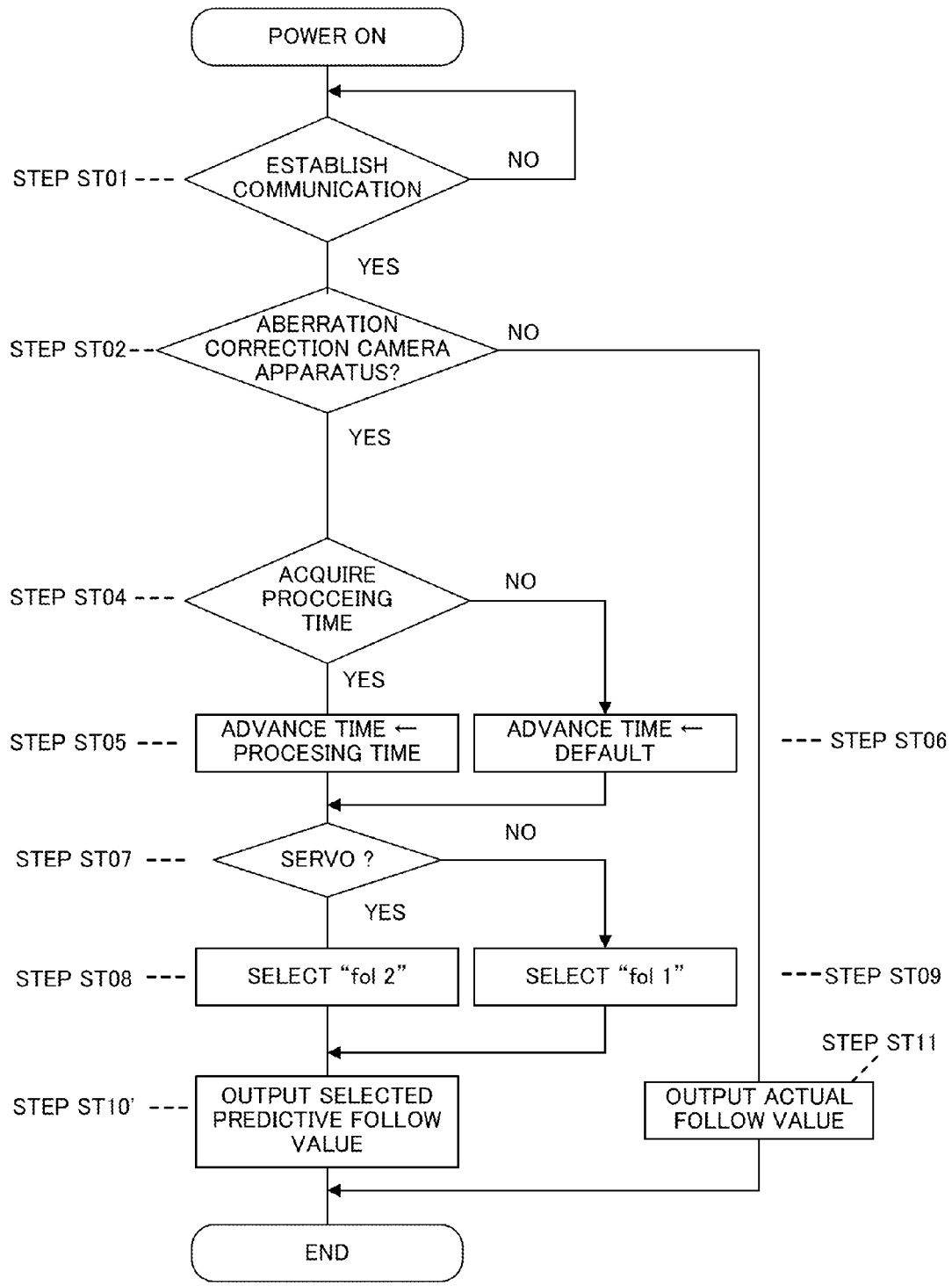
FIG. 10 is a flowchart showing the processing in Example 3.

Next, description will be made of initialization processing after power-on of the lens apparatus 5 with reference to FIG. 10. This initialization processing is performed by the CPU 53 according to a computer program stored in an internal memory thereof.

The processes performed by the CPU 53 at steps ST01 to ST06 and at step ST11 are the same as those in Example 2.

When the process proceeds from steps ST05 and ST06 to step ST07, the CPU 53 determines whether or not the movable part 36 is in a servo-controlled state. If the movable part 36 is in the servo-controlled state, the process proceeds to step ST08. If the movable part 36 is not in the servo-controlled state (that is, in a manual-operated state), the process proceeds to step ST09.

At step ST08, the CPU 53 selects the predictive follow value fol2. Then, the process proceeds to step ST10'. At step ST09 the CPU 53 selects the predictive follow value fol1. Then, the process proceeds to step ST10'.

At step ST10', the CPU 53 outputs the selected predictive follow value to the camera apparatus 4.

As described above, in this example, when the movable part 36 is in the servo-controlled state, the predictive follow value fol2 calculated by using the actual follow value and the control value is output to the camera apparatus 4. On the other hand, when the movable part 36 is in the manual-operated state, the predictive follow value foil calculated by using the actual follow value and the operating speed calculated based on the actual follow value is output to the camera apparatus 4. This makes it possible to output an appropriate predictive follow value to the camera apparatus 4 regardless of whether the movable part 36 is in the servo-controlled state or in the manual-operated state.

The adjustment amount Δt output from the advance predictive value calculating part 531 may be set independently for the servo-controlled state and the manual-operated state. This can increase a degree of freedom of the adjustment.

Further, although the description was made of the case where the predictive follow value fol2 is calculated by using the control value and the actual follow value in the servo-controlled state in this example, the predictive follow value fol2 may be calculated by using only the actual follow value as is the case in the manual-operated state. In addition, one of the predictive follow values foil and fol2 which has higher reliability than the other may be selected by the user or automatically. This can realize aberration correction image processing with higher accuracy.

EXAMPLE 4

Figure 11:
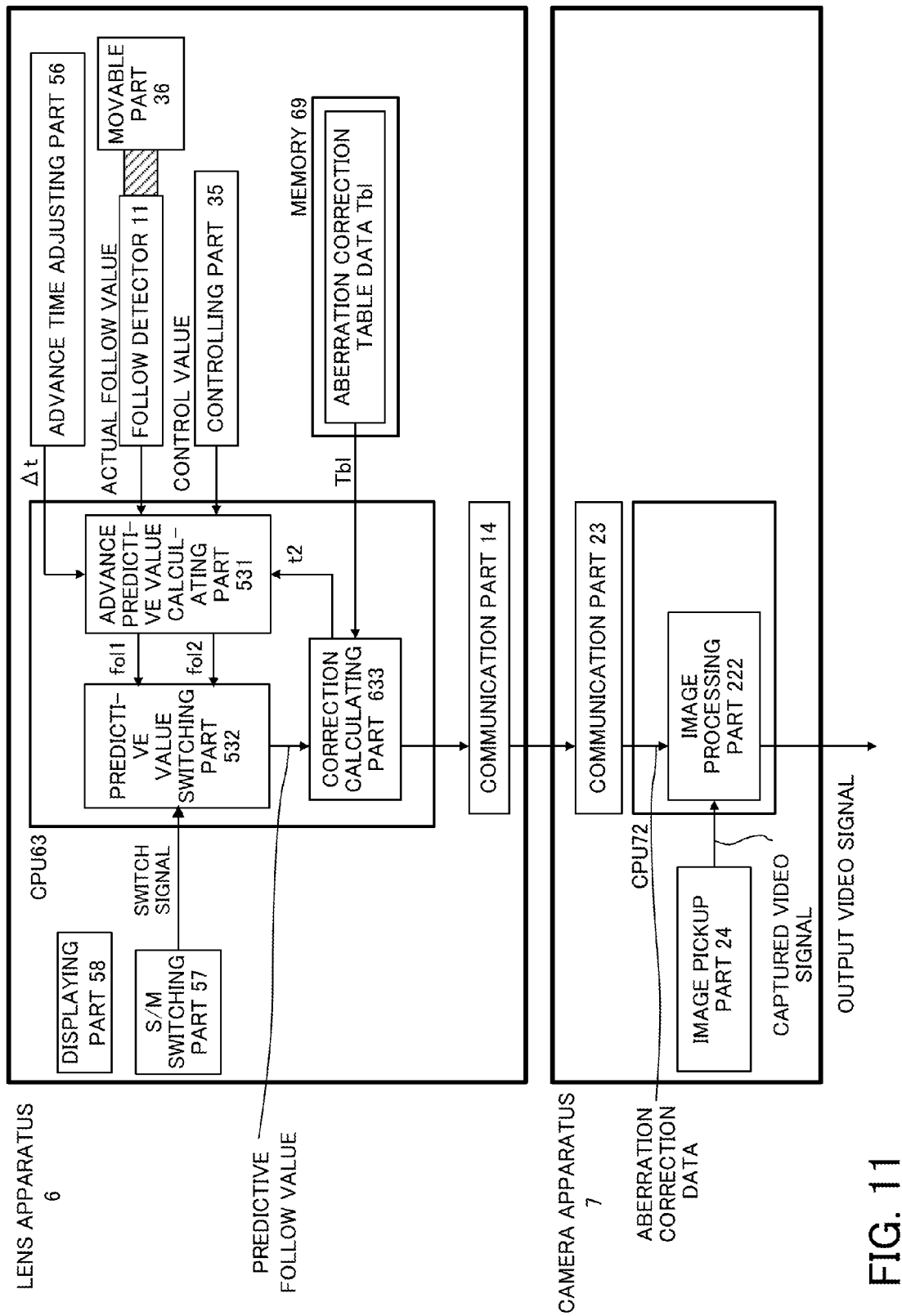
FIG. 11 is a block diagram showing a configuration of an image pickup system that is Example 4 of the present invention.

FIG. 11 shows a configuration of an image pickup system using a lens apparatus 6 including an information supplying apparatus that is a fourth example (Example 4) of the present invention and a conventional camera apparatus 7 including an image processing apparatus.

The lens apparatus 6 has a configuration in which a memory (nonvolatile memory) 69 for holding the aberration correction table data Tbl that was held by the memory 21 in the camera apparatuses in Examples 1 to 3 is added to that of the lens apparatus in Example 3. Components in this example identical to those in Example 3 are denoted with the same reference numerals as those in Example 3, and their descriptions are omitted. On the other hand, the camera apparatus 7 is not provided with a memory for holding the aberration correction table data Tbl and the correction calculating part.

A correction calculating part 633 provided in a CPU 63 in the lens apparatus 6 outputs the processing time (advance time) t2 to the advance predictive value calculating part 531. The advance predictive value calculating part 531 calculates the predictive follow values fol1 and fol2 by using the actual follow value from the follow detector 11 and the control value from the controlling part 35.

Then, the correction calculating part 633 generates aberration correction data corresponding to the predictive follow value (fol1 or fol2) output from the predictive value switching part 532 by using the aberration correction table data Tbl held in the memory 69. The aberration correction data is output to the camera apparatus 7.

Although the predictive follow value is output to the camera apparatus as the first information in Examples 1 to 3, the aberration correction data corresponding to the predictive follow value is output to the camera apparatus 7 as the first information in this example.

A CPU 72 in the camera apparatus 7 acquires the aberration correction data corresponding to the predictive follow value from the lens apparatus 6. The image processing part 222 in the CPU 72 performs the aberration correction image processing on the captured image signal, and outputs a processed image (video) signal as an output video signal.

In this example, the follow detector 11, the advance predictive value calculating part 531, the predictive value switching part 532 and the correction calculating part 633 constitute the information supplying apparatus. The image processing part 222 constitutes the image processing apparatus.

In this example, since the aberration correction table data Tbl is held in the lens apparatus 6, it is not necessary that the aberration correction table data Tbl is held by the camera apparatus 7. Therefore, even when the conventional camera apparatus 7 which does not hold the aberration correction table data Tbl is used, an image pickup system can be achieved which is capable of performing aberration correction image processing equivalent to that performed in the image pickup systems of Examples 1 to 3. In addition, according to this example, even when plural lens apparatuses 6 generate mutually different aberrations, the memory 69 can hold the aberration correction table data Tbl corresponding to the aberration generated in each lens apparatus 6. Therefore, more highly accurate aberration correction image processing can be performed.

EXAMPLE 5

Figure 12:
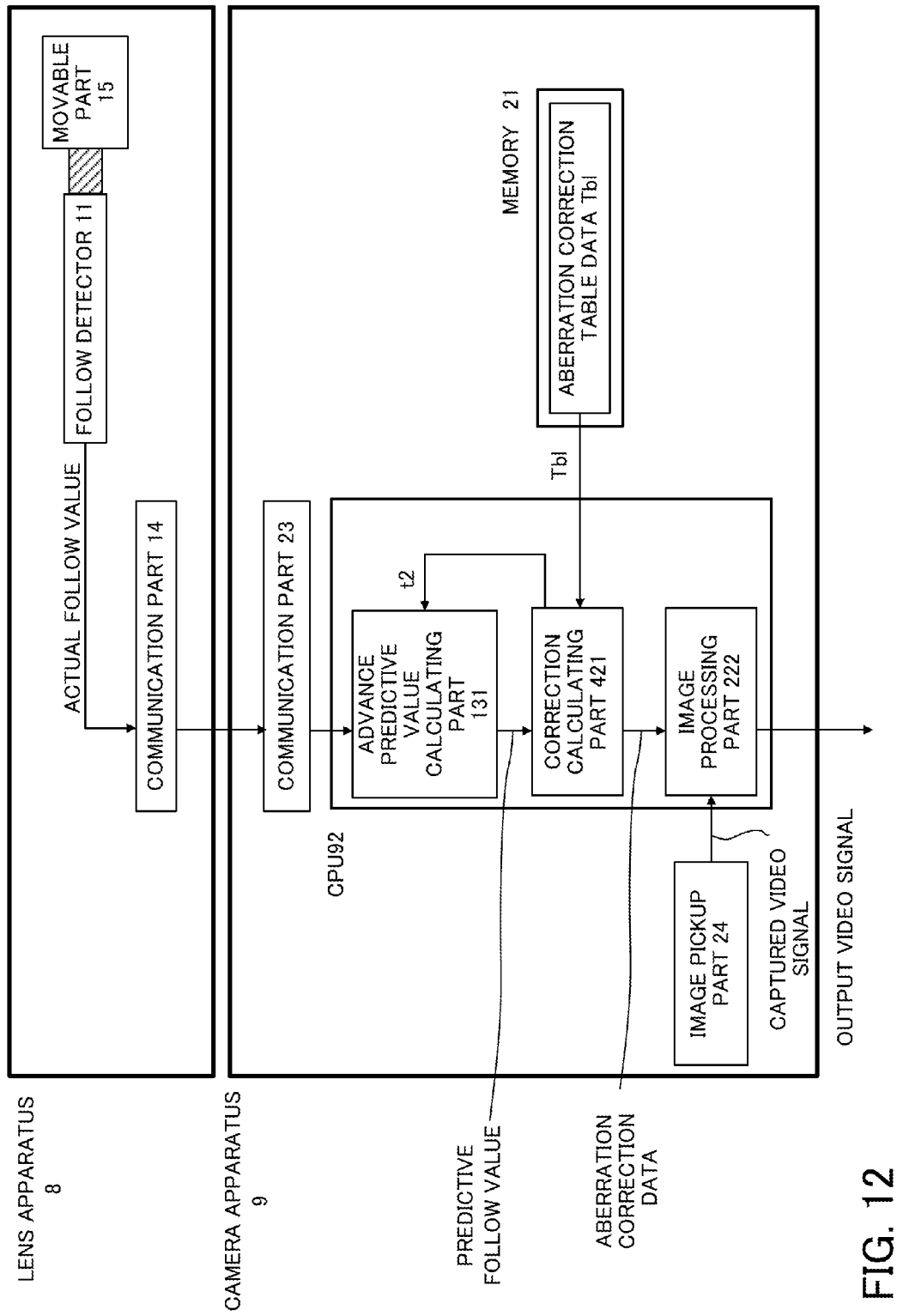
FIG. 12 is a block diagram showing a configuration of an image pickup system that is Example 5 of the present invention.

FIG. 12 shows a configuration of an image pickup system constituted by a conventional lens apparatus 8 and a camera apparatus 9 including an information supplying apparatus that is a fifth example (Example 5) of the present invention and an image processing apparatus.

This example shows an example of the image pickup system in which the advance predictive value calculating part 131, which was provided in the CPU 13 of the lens apparatus 1 in Example 1, is provided in a CPU 92 of the camera apparatus 9. Therefore, the lens apparatus 8 is provided with the follow detector 11, but is not provided with the advance predictive value calculating part. The CPU 92 is further provided with the image pickup part 24, the memory 21, the image processing part 222 and the communication part 23 as in Example 1, and with the correction calculating part 421 shown in Example 2. Other components in this example identical to those in Example 1 are denoted with the same reference numerals as those in Example 1, and their descriptions are omitted.

The lens apparatus 8 directly outputs the actual follow value of the movable part 15 detected by the follow detector 11 to the camera apparatus 9 through the communication part 14.

The actual follow value detected by the follow detector 11 is input from the lens apparatus 8 to the CPU 92 of the camera apparatus 9 through the communication parts 14 and 23.

The advance predictive value calculating part 131 in the CPU 92 calculates, based on the actual follow value from the lens apparatus 8 and the processing time (advance time) t2 from the correction calculating part 421, the predictive follow value which shows a predictive position of the movable part 15 at a point in time after the processing time t2 from the time of the detection (input) of the actual follow value. The calculated predictive follow value is output to the correction calculating part 421.

In this example, the communication part 23 of the camera apparatus 9 serves as an information acquiring part which acquires the actual follow value detected by the follow detector 11 provided in the lens apparatus 8.

Further, in this example, the communication part 23, the advance predictive value calculating part 131 and the correction calculating part 421 constitute the information supplying apparatus, and the image processing part 222 constitutes the image processing apparatus. However, the information supplying apparatus may be regarded as being constituted by the communication part 23 and the advance predictive value calculating part 131, and the image processing apparatus may be regarded as being constituted by the correction calculating part 421 and the image processing part 222.

According to this example, the predictive follow value can be calculated as in the other examples by using the actual follow value output from the conventional lens apparatus 8 having no advance predictive value calculating part, and the aberration correction data corresponding to the predictive follow value can be generated. Therefore, even when the conventional lens apparatus 8 is used, a delay of the aberration correction image processing can be reduced.

When the lens apparatus 8 is provided with the controlling part 35 shown in Example 2, the camera apparatus 9 may take the control value from the controlling part 35 to generate the predictive follow value and the aberration correction data corresponding thereto.

EXAMPLE 6

Figure 13:
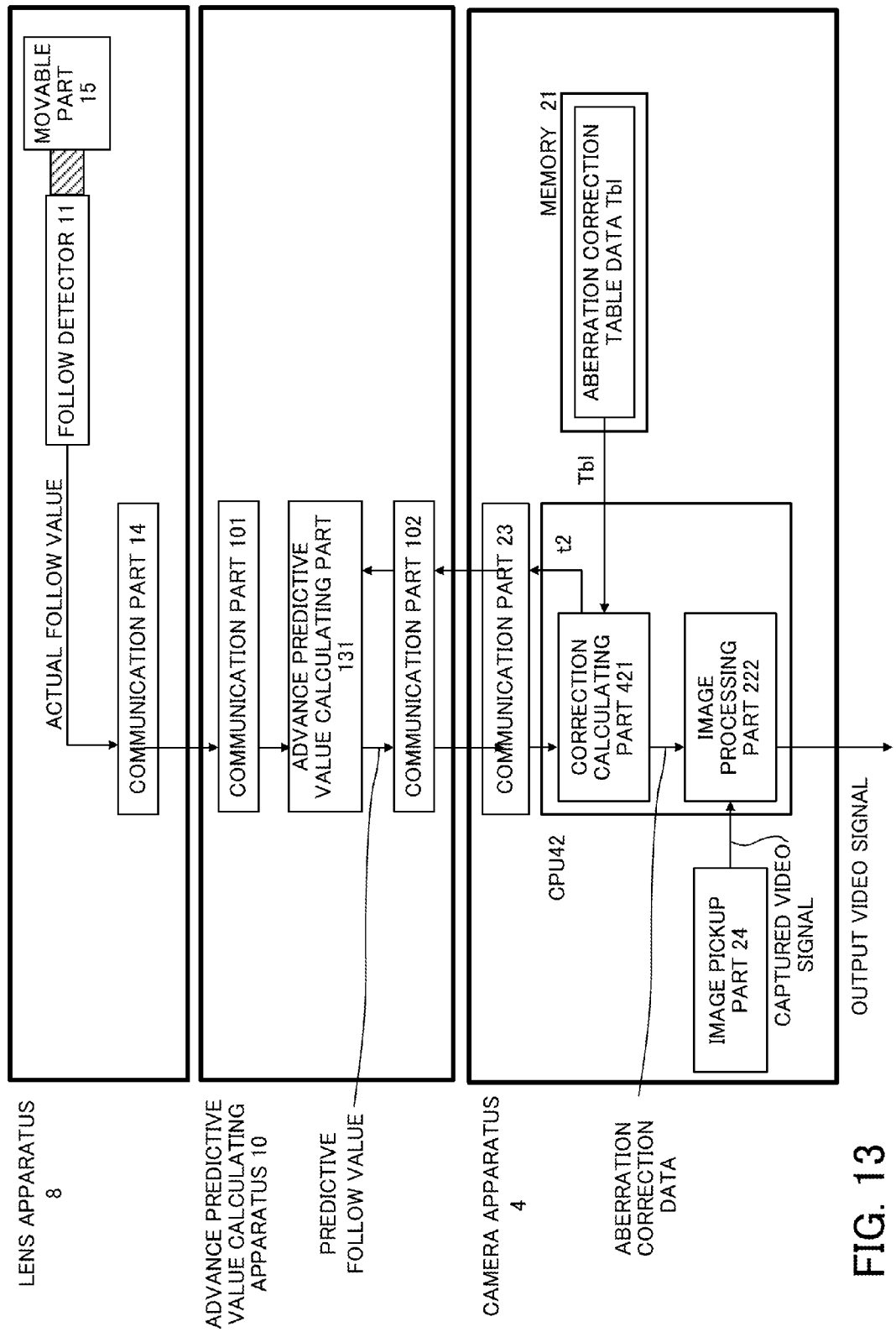
FIG. 13 is a block diagram showing a configuration of an image pickup system that is Example 6 of the present invention.

FIG. 13 shows a configuration of an image pickup system constituted by the conventional lens apparatus 8 described in Example 5, the camera apparatus 4 including the image processing apparatus described in Example 2, and an advance predictive value calculating apparatus 10 which is an information supplying apparatus and connected with the lens and camera apparatuses 8 and 4.

The advance predictive value calculating apparatus 10 includes communication parts 101 and 102 and an advance predictive value calculating part 131. The communication part 101 is provided for communication between the advance predictive value calculating apparatus 10 and the lens apparatus 8. The actual follow value from the follow detector 11 provided in the lens apparatus 8 is input to the advance predictive value calculating part 131 through the communication part 101.

The advance predictive value calculating part 131 calculates, based on the actual follow value of the movable part 15 input from the lens apparatus 8 and the processing time (advance time) t2 input from the camera apparatus 4, the predictive follow value at a point in time after the processing time t2 from the time of the detection (acquisition) of the actual follow value.

The communication part 102 is provided for communication between the advance predictive value calculating apparatus 10 and the camera apparatus 4. The predictive follow value calculated by the advance predictive value calculating apparatus 10 is output to the camera apparatus 4 through the communication part 102. Further, the processing time t2 is input from the correction calculating part 421 provided in the CPU 42 of the camera apparatus 4 to the advance predictive value calculating apparatus 10 through the communication part 102.

According to this example, even if the lens apparatus and the camera apparatus do not have the function of calculating the predictive follow value, the calculation of the predictive follow value and the generation of the aberration correction data can be made as in the other examples by connecting the advance predictive value calculating apparatus 10 with the lens apparatus and the camera apparatus. As a result, a delay of the aberration correction image processing can be reduced.

In this example, the description was made of the case where the correction calculating part 421 is provided in the camera apparatus 4. However, the correction calculating part 421 may be provided in the advance predictive value calculating apparatus 10 such that the aberration correction data (predictive value) as the first information is output from the advance predictive value calculating apparatus 10 to the camera apparatus 4.

EXAMPLE 7

Figure 14:
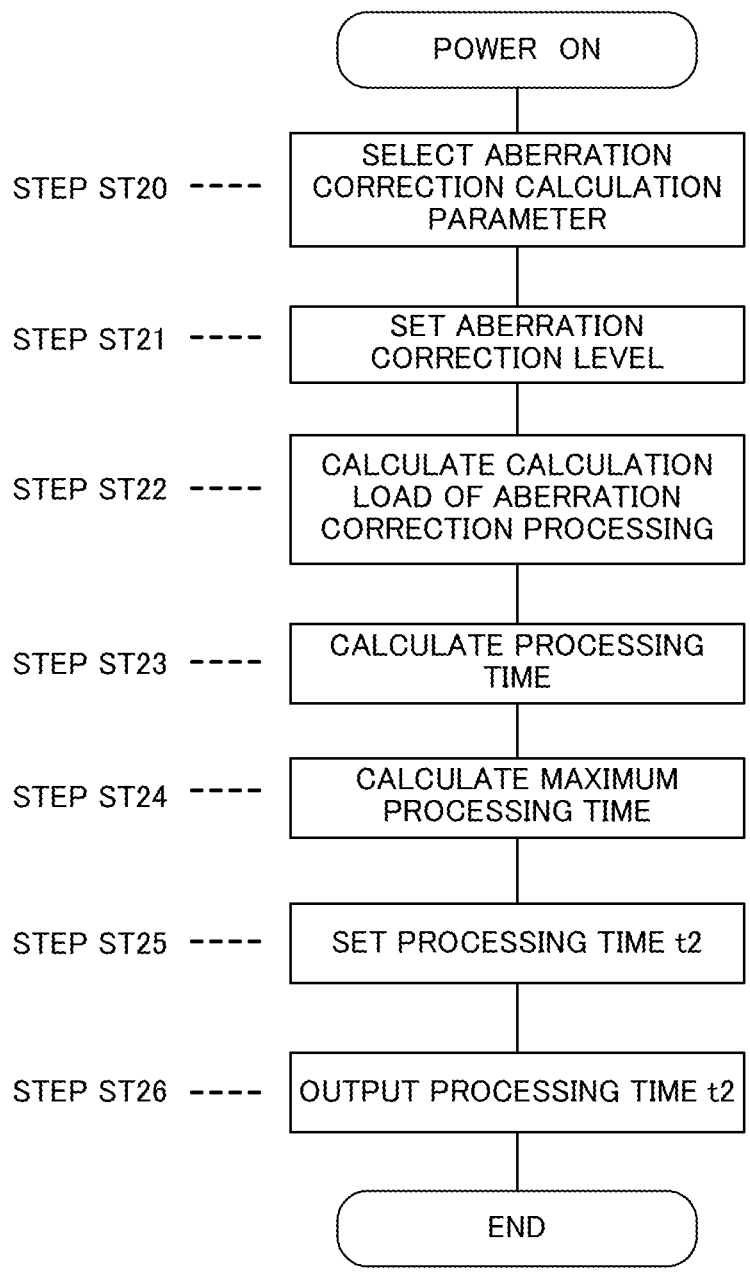
FIG. 14 is a flowchart showing processing in Example 7 of the present invention.

FIG. 14 mainly shows a decision sequence of the processing time t2 described in Examples 2 to 6. The processing time t2 is decided by the correction calculating part 421 or 633 in Examples 2 to 6. Hereinafter, description will be made of the decision sequence of the processing time t2 executed in the correction calculating part 421 shown in Example 6.

After power-on of the camera apparatus 4, at step ST20, the correction calculating part 421 selects a parameter used for calculation of aberration correction data (hereinafter referred to as "aberration correction calculation parameter") corresponding to a movable part which is a target of the calculation of the aberration correction data among the plural movable parts (the magnification-varying lens, the focus lens, the iris and the IS) 15. The aberration correction calculation parameter is a variable which is according to the movable part and used for generation of the aberration correction data corresponding to the predictive follow value from the aberration correction table data Tbl. The aberration correction calculation parameter enables generation of the aberration correction data corresponding to the movable part which is the target of aberration correction data calculation from the aberration correction table data Tbl.

Next, at step ST21, the correction calculating part 421 sets a level of aberration correction (hereinafter referred to as "aberration correction level"). The aberration correction level shows a level of correction performed by the aberration correction image processing for the captured image signal. In general, a high-definition video such as a super high vision video requires highly-accurate aberration correction image processing, so that a higher aberration correction level is set for the high-definition video. A higher aberration correction level requires a higher resolution of the predictive follow value used for the aberration correction image processing.

Next, at step ST22, the correction calculating part 421 calculates a calculation load in calculation of the aberration correction data. Specifically, the correction calculating part 421 calculates the calculation load based on a calculation amount in calculation of the aberration correction calculation parameter, the aberration correction level and the aberration correction data, and processing ability of the correction calculating part 421. In general, the calculation load is calculated by dividing the calculation amount by the processing ability.

In addition, at step ST23, the correction calculating part 421 calculates the processing time based on the calculation load calculated at step ST22. The processing time herein is a time required from input (or detection or acquisition) of the predictive follow value to calculation and output of the aberration correction data.

Further, at step ST24, the correction calculating part 421 calculates a maximum processing time. A processing time required in a case where operations of two or more of the plural movable parts 15 overlap each other is often longer than that required in a case each movable part operates individually. Therefore, the correction calculating part 421 calculates a longest one of the processing times required for one or two or more currently operating movable parts as the maximum processing time.

The case where the processing time becomes long includes not only the above-described case where the operations of the movable parts overlap each other, but also a case where the CPU 42 including the correction calculating part 421 performs, in parallel with the calculation processing of the aberration correction data, other processing such as communication processing.

Next, at step ST25, the correction calculating part 421 sets the maximum processing time calculated at step ST24 to the processing time t2. Then, at step ST26, the correction calculating part 421 outputs the processing time t2 to the advance predictive value calculating part 131.

The maximum processing time may be calculated for each movable part and the respective maximum processing times may be set and output as the processing time t2. Further, a longest one of the maximum processing times calculated for the respective movable parts may be set a processing time common to all the movable parts. Moreover, if the calculation load of the correction calculating part 421 frequently varies and thereby the maximum processing time is changed, the processing time t2 may be updated according to the change.

As described above, in each of Examples 1 to 7, predictive information (the predictive follow value as the first information and the aberration correction data corresponding thereto) used for the aberration correction image processing for a captured image is calculated on the basis of the actual follow value of the movable part provided in the lens apparatus. This enables calculation of the aberration correction data prior to input of the captured image, which results in reduction of a time delay occurring in the aberration correction image processing.

In particular, since the aberration correction image processing for a high definition captured image such as a super high vision image requires a long time to calculate the aberration correction data, the time delay reduction effect is significant. Moreover, in a case where processing performance of the correction calculating part which calculates the aberration correction data is low, a sufficient time delay reduction effect can be obtained.

While the present invention has been described with reference to an exemplary example, it is to be understood that the invention is not limited to the disclosed exemplary example. The scope of the follow value claims is to be accorded the broadest interpretation so as to encompass all modifications, equivalent structures and functions.

For example, although each example described the case where the movable part is a lens, an iris and an IS each operating mechanically, the movable part may perform digital zoom and electronic image stabilization.

Moreover, although each example described the case where the information showing the position of the movable part is used as the information showing the state of the movable part, the information may show the operating speed of the movable part.

In addition, each example described the case where the aberration correction image processing is performed in the camera apparatus. However, the aberration correction image processing may be performed in an external apparatus such as a personal computer (image processing apparatus) other than the camera apparatus and the lens apparatus for a captured image taken from the camera apparatus. Moreover, the external apparatus may serve as an information supplying apparatus which calculates the predictive follow value and the aberration correction data corresponding thereto. In this case, the advance time for predictive follow vale calculation may be set based on a processing time required for calculation of the aberration correction data by the external apparatus.

This application claims the benefit of Japanese Patent Application No. 2008-130659, filed on May 19, 2008, which is hereby incorporated by reference herein in its entirety.

Industrial Applicability

The present invention can provide an image supplying apparatus capable of performing appropriate aberration correction image processing and of reducing a delay of the aberration correction image processing.

The invention claimed is:

1. An information supplying apparatus configured to supply first information to an image processing apparatus performing image processing for reducing an image component which is included in an image obtained by image pickup through an optical system and is generated due to aberration of the optical system, the first information being used in the image processing, the information supplying apparatus comprising:
   an information acquiring part configured to acquire second information showing a state of at least one of an optical adjusting element included in the optical system and an operation part operated for actuating the optical adjusting element; and
   an information generating part configured to generate the first information used in the image processing performed at a point in time after an elapse of a predetermined time from acquisition of the second information, based on the second information and a command signal for controlling at least one of the optical adjusting element and the operation part.

2. An information supplying apparatus according to claim 1,
   wherein the state is a position of at least one of the optical adjusting element and the operation part.

3. An information supplying apparatus according to claim 1,
   wherein the first information is information showing the state predicted at the point in time after the elapse of the predetermined time from the acquisition of the second information.

4. An information supplying apparatus according to claim 1,
   wherein the first information is information showing a parameter for the image processing according to the state predicted at the point in time after the elapse of the predetermined time from the acquisition of the second information.

5. An information supplying apparatus according to claim 3,
   wherein the information generating part is configured to generate the first information showing the state predicted at a point in time after the elapse of the predetermined time from the acquisition of the second information, and is configured to set the predetermined time based on a time required to generate a parameter for the image processing by using the first information.

6. An information supplying apparatus according to claim 5,
   wherein the information generating part is configured to obtain the time required to generate the parameter from the image processing apparatus.

7. An information supplying apparatus according to claim 1,
   wherein the information supplying apparatus further comprises a predetermined time changing part operated for changing the predetermined time.

8. A lens apparatus comprising:
   an optical system; and
   an information supplying apparatus configured to supply first information to an image processing apparatus performing image processing for reducing an image component which is included in an image obtained by image pickup through an optical system and is generated due to aberration of the optical system, the first information being used in the image processing;
   wherein the information supplying apparatus includes an information acquiring part configured to acquire second information showing a state of at least one of an optical adjusting element included in the optical system and an operation part operated for actuating the optical adjusting element, and
   an information generating part configured to generate the first information used in the image processing performed at a point in time after an elapse of a predetermined time from acquisition of the second information, based on the second information and a command signal for controlling at least one of the optical adjusting element and the operation part.

9. A camera apparatus configured to perform image pickup of an object image formed by an optical system to generate a captured image corresponding to the object image, the camera apparatus comprising:
   an information supplying apparatus configured to supply first information to an image processing apparatus performing image processing for reducing an image component which is included in an image obtained by image pickup through an optical system and is generated due to aberration of the optical system, the first information being used in the image processing; and
   an image processing apparatus configured to perform image processing for reducing an image component which is included in the captured image and generated due to aberration of the optical system by using the first information obtained from the information supplying apparatus;
   wherein the information supplying apparatus includes an information acquiring part configured to acquire second information showing a state of at least one of an optical adjusting element included in the optical system and an operation part operated for actuating the optical adjusting element, and an information generating part configured to generate the first information used in the image processing performed at a point in time after an elapse of a predetermined time from acquisition of the second information, based on the second information and a command signal for controlling at least one of the optical adjusting element and the operation part.

10. An image pickup system comprising:
a lens apparatus including an optical system;
a camera apparatus configured to perform image pickup of an object image formed by the optical system to generate a captured image corresponding to the object image;
an information supplying apparatus configured to supply first information to an image processing apparatus performing image processing for reducing an image component which is included in an image obtained by image pickup through an optical system and is generated due to aberration of the optical system, the first information being used in the image processing; and
an image processing apparatus configured to perform image processing for reducing an image component which is included in the captured image and generated due to aberration of the optical system by using the first information obtained from the information supplying apparatus;
wherein the information supplying apparatus includes an information acquiring part configured to acquire second information showing a state of at least one of an optical adjusting element included in the optical system and an operation part operated for actuating the optical adjusting element, and an information generating part configured to generate the first information used in the image processing performed at a point in time after an elapse of a predetermined time from acquisition of the second information, based on the second information and a command signal for controlling at least one of the optical adjusting element and the operation part.

11. A lens apparatus as claimed in claim 8, wherein the state is a position of at least one of the optical adjusting element and the operation part.

12. A lens apparatus as claimed in claim 8, wherein the first information is information showing the state predicted at the point in time after the elapse of the predetermined time from the acquisition of the second information.

13. A lens apparatus as claimed in claim 8, wherein the first information is information showing a parameter for the image processing according to the state predicted at the point in time after the elapse of the predetermined time from the acquisition of the second information.

14. A lens apparatus as claimed in claim 12, wherein the information generating part is configured to generate the first information showing the state predicted at a point in time after the elapse of the predetermined time from the acquisition of the second information, and is configured to set the predetermined time based on a time required to generate a parameter for the image processing by using the first information.

15. A lens apparatus as claimed in claim 14, wherein the information generating part is configured to obtain the time required to generate the parameter from the image processing apparatus.

16. A lens apparatus as claimed in claim 8, wherein the information supplying apparatus further comprises a predetermined time changing part operated for changing the predetermined time.

17. A camera apparatus as claimed in claim 9, wherein the state is a position of at least one of the optical adjusting element and the operation part.

18. A camera apparatus as claimed in claim 9, wherein the first information is information showing the state predicted at the point in time after the elapse of the predetermined time from the acquisition of the second information.

19. A camera apparatus as claimed in claim 9, wherein the first information is information showing a parameter for the image processing according to the state predicted at the point in time after the elapse of the predetermined time from the acquisition of the second information.

20. A camera apparatus as claimed in claim 18, wherein the information generating part is configured to generate the first information showing the state predicted at a point in time after the elapse of the predetermined time from the acquisition of the second information, and is configured to set the predetermined time based on a time required to generate a parameter for the image processing by using the first information.

21. A camera apparatus as claimed in claim 20, wherein the information generating part is configured to obtain the time required to generate the parameter from the image processing apparatus.

22. A camera apparatus as claimed in claim 9, wherein the information supplying apparatus further comprises a predetermined time changing part operated for changing the predetermined time.

23. An image pickup apparatus as claimed in claim 10, wherein the state is a position of at least one of the optical adjusting element and the operation part.

24. An image pickup apparatus as claimed in claim 10, wherein the first information is information showing the state predicted at the point in time after the elapse of the predetermined time from the acquisition of the second information.

25. An image pickup apparatus as claimed in claim 10, wherein the first information is information showing a parameter for the image processing according to the state predicted at the point in time after the elapse of the predetermined time from the acquisition of the second information.

26. An image pickup apparatus as claimed in claim 24, wherein the information generating part is configured to generate the first information showing the state predicted at a point in time after the elapse of the predetermined time from predetermined time from the acquisition of the second information, and is configured to set the predetermined time based on a time required to generate a parameter for the image processing by using the first information.

27. An image pickup apparatus as claimed in claim 26, wherein the information generating part is configured to obtain the time required to generate the parameter from the image processing apparatus.

28. An image pickup apparatus as claimed in claim 10, wherein the information supplying apparatus further comprises a predetermined time changing part operated for changing the predetermined time.

29. An information supplying apparatus configured to supply first information to an image processing apparatus performing image processing for reducing an image component which is included in an image obtained by image pickup through an optical system based on the first information being used in the image processing, the information supplying apparatus comprising:
- an information acquiring part configured to acquire second information showing a state of an optical adjusting element included in the optical system; and
- an information generating part configured to generate the first information used for the image processing performed at a point in time after an elapse of a predetermined time from acquisition of the second information, based on the second information and instruction information for controlling the optical adjusting element.

30. An information supplying apparatus according to claim 29,
wherein the state is a position of the optical adjusting element.

31. An information supplying apparatus according to claim 29,
wherein the first information is information showing the state predicted at the point in time after the elapse of the predetermined time from the acquisition of the second information.

32. An information supplying apparatus according to claim 29,
wherein the first information is information showing a parameter for the image processing according to the state predicted at the point in time after the elapse of the predetermined time from the acquisition of the second information.

33. An information supplying apparatus according to claim 31,
wherein the information generating part is configured to generate the first information showing the state predicted at a point in time after the elapse of the predetermined time from the acquisition of the second information, and is configured to set the predetermined time based on a time required to generate a parameter for the image processing by using the first information.

34. An information supplying apparatus according to claim 33,
wherein the information generating part is configured to obtain the time required to generate the parameter from the image processing apparatus.

35. An information supplying apparatus according to claim 29,
wherein the information supplying apparatus further comprises a predetermined time changing part operated for changing the predetermined time.

36. A lens apparatus comprising:
an optical system; and
an information supplying apparatus configured to supply first information to an image processing apparatus performing image processing for reducing an image component which is included in an image obtained by image pickup through an optical system based on the first information being used in the image processing;
wherein the information supplying apparatus includes an information acquiring part configured to acquire second information showing a state of an optical adjusting element included in the optical system, and
an information generating part configured to generate the first information used for the image processing performed at a point in time after an elapse of a predetermined time from acquisition of the second information, based on the second information and
instruction information for controlling the optical adjusting element.

37. A camera apparatus configured to perform image pickup of an object image formed by an optical system to generate a captured image corresponding to the object image, the camera apparatus comprising:
- an information supplying apparatus configured to supply first information to an image processing apparatus performing image processing for reducing an image component which is included in an image obtained by image pickup through an optical system based on the first information being used in the image processing; and
- an image processing apparatus configured to perform image processing for reducing an image component which is included in the captured image based on the first information obtained from the information supplying apparatus;
wherein the information supplying apparatus includes an information acquiring part configured to acquire second information showing a state of an optical adjusting element included in the optical system, and an information generating part configured to generate the first information used for the image processing performed at a point in time after an elapse of a predetermined time from acquisition of the second information, based on the second information and instruction information for controlling the optical adjusting element.

38. An image pickup system comprising:
a lens apparatus including an optical system;
a camera apparatus configured to perform image pickup of an object image formed by the optical system to generate a captured image corresponding to the object image;
an information supplying apparatus configured to supply first information to an image processing apparatus performing image processing for reducing an image component which is included in an image obtained by image pickup through an optical system based on the first information being used in the image processing; and
an image processing apparatus configured to perform image processing for reducing an image component which is included in the captured image based on the first information obtained from the information supplying apparatus;
wherein the information supplying apparatus includes an information acquiring part configured to acquire second information showing a state of an optical adjusting element included in the optical system, and an information generating part configured to generate the first information used for the image processing performed at a point in time after an elapse of a predetermined time from acquisition of the second information, based on the second information and instruction information for controlling the optical adjusting element.

39. A lens apparatus as claimed in claim 36,
wherein the state is a position of the optical adjusting element.

40. A lens apparatus as claimed in claim 36,
wherein the first information is information showing the state predicted at the point in time after the elapse of the predetermined time from the acquisition of the second information.

41. A lens apparatus as claimed in claim 36,
wherein the first information is information showing a parameter for the image processing according to the state predicted at the point in time after the elapse of the predetermined time from the acquisition of the second information.

42. A lens apparatus as claimed in claim 40,
wherein the information generating part is configured to generate the first information showing the state predicted at a point in time after the elapse of the predetermined time from the acquisition of the second information, and is configured to set the predetermined time based on a time required to generate a parameter for the image processing by using the first information.

43. A lens apparatus as claimed in claim 42, wherein the information generating part is configured to obtain the time required to generate the parameter from the image processing apparatus.

44. A lens apparatus as claimed in claim 36,
wherein the information supplying apparatus further comprises a predetermined time changing part operated for changing the predetermined time.

45. A camera apparatus as claimed in claim 37,
wherein the state is a position of the optical adjusting element.

46. A camera apparatus as claimed in claim 37,
wherein the first information is information showing the state predicted at the point in time after the elapse of the predetermined time from the acquisition of the second information.

47. A camera apparatus as claimed in claim 37,
wherein the first information is information showing a parameter for the image processing according to the state predicted at the point in time after the elapse of the predetermined time from the acquisition of the second information.

48. A camera apparatus as claimed in claim 46,
wherein the information generating part is configured to generate the first information showing the state predicted at a point in time after the elapse of the predetermined time from the acquisition of the second information, and is configured to set the predetermined time based on a time required to generate a parameter for the image processing by using the first information.

49. A camera apparatus as claimed in claim 48,
wherein the information generating part is configured to obtain the time required to generate the parameter from the image processing apparatus.

50. A camera apparatus as claimed in claim 37,
wherein the information supplying apparatus further comprises a predetermined time changing part operated for changing the predetermined time.

51. An image pickup system as claimed in claim 38,
wherein the state is a position of the optical adjusting element.

52. An image pickup system as claimed in claim 38,
wherein the first information is information showing the state predicted at the point in time after the elapse of the predetermined time from the acquisition of the second information.

53. An image pickup system as claimed in claim 38,
wherein the first information is information showing a parameter for the image processing according to the state predicted at the point in time after the elapse of the predetermined time from the acquisition of the second information.

54. An image pickup system as claimed in claim 52,
wherein the information generating part is configured to generate the first information showing the state predicted at a point in time after the elapse of the predetermined time from predetermined time from the acquisition of the second information, and is configured to set the predetermined time based on a time required to generate a parameter for the image processing by using the first information.

55. An image pickup system as claimed in claim 54,
wherein the information generating part is configured to obtain the time required to generate the parameter from the image processing apparatus.

56. An image pickup system as claimed in claim 38,
wherein the information supplying apparatus further comprises a predetermined time changing part operated for changing the predetermined time.

57. An information supplying apparatus as claimed in claim 29,
wherein the image processing is processing for reducing an image component which is included in an image obtained by image pickup through an optical system and is generated due to aberration of the optical system.

58. A lens apparatus as claimed in claim 36,
wherein the image processing is processing for reducing an image component which is included in an image obtained by image pickup through an optical system and is generated due to aberration of the optical system.

59. A lens apparatus as claimed in claim 36, further comprising:
a memory in which correction table data is stored; and
a calculator configured to calculate correction data corresponding to the first information based on the first information and the correction table data, and to output the correction data corresponding to the first information to the image processing apparatus.

60. A camera apparatus as claimed in claim 37,
wherein the predetermined time is a required time period to calculation of the correction data corresponding to the first information based on the first information and the correction table data.

61. A camera apparatus as claimed in claim 37,
wherein the image processing is processing for reducing an image component which is included in an image obtained by image pickup through an optical system and is generated due to aberration of the optical system.

62. A camera apparatus as claimed in claim 37, further comprising:
a memory in which correction table data is stored; and
a calculator configured to calculate correction data corresponding to the first information based on the first information and the correction table data,
wherein the image processing apparatus performs the image processing at a point in time after an elapse of a predetermined time from acquisition of the second information, using the correction data corresponding to the first information.

63. An image pickup system as claimed in claim 38,
wherein the image processing is processing for reducing an image component which is included in an image obtained by image pickup through an optical system and is generated due to aberration of the optical system.

64. An image pickup system as claimed in claim 38, further comprising:
a memory in which correction table data is stored; and
a calculator configured to calculate correction data corresponding to the first information based on the first information and the correction table data,
wherein the image processing apparatus performs the image processing at a point in time after an elapse of a predetermined time from acquisition of the second information, using the correction data corresponding to the first information.

65. An image pickup system as claimed in claim 38,
wherein the predetermined time is a required time period to calculation of the correction data corresponding to the first information based on the first information and the correction table data.

66. A method of supplying first information to an image processing apparatus performing image processing for reducing an image component which is included in an image obtained by image pickup through an optical system based on the first information, said method comprising the steps of:
acquiring second information showing a state of an optical adjusting element included in an optical system; and
generating the first information used for the image processing performed at a point in time after an elapse of a predetermined time from acquisition of the second information, based on the second information and instruction information for controlling the optical adjusting element.

67. A method as claimed in claim 66,
wherein the image processing is processing for reducing an image component which is included in an image obtained by image pickup through an optical system and is generated due to aberration of the optical system.

68. A method as claimed in claim 66,
wherein the predetermined time is a required time period to calculation of the correction data corresponding to the first information based on the first information and the correction table data.

69. A method of performing image processing for reducing an image component which is included in an image obtained by image pickup through an optical system based on first information being used in the image processing, said method comprising the steps of:
acquiring second information showing a state of an optical adjusting element included in an optical system;
generating the first information used for the image processing performed at a point in time after an elapse of a predetermined time from acquisition of the second information, based on the second information and instruction information for controlling the optical adjusting element;
calculating correction data corresponding to the first information based on the first information and the correction table data; and
performing the image processing at a point in time after an elapse of a predetermined time from acquisition of the second information, using the correction data corresponding to the first information.

70. A method as claimed in claim 69,
wherein the image processing is processing for reducing an image component which is included in an image obtained by image pickup through an optical system and is generated due to aberration of the optical system.

71. A method as claimed in claim 69,
wherein the predetermined time is a required time period to calculation of the correction data corresponding to the first information based on the first information and the correction table data.

* * * * *